Oct. 10, 1950     F. A. SCHMIDT     2,524,997
SOLDERING IRON
Filed March 20, 1947
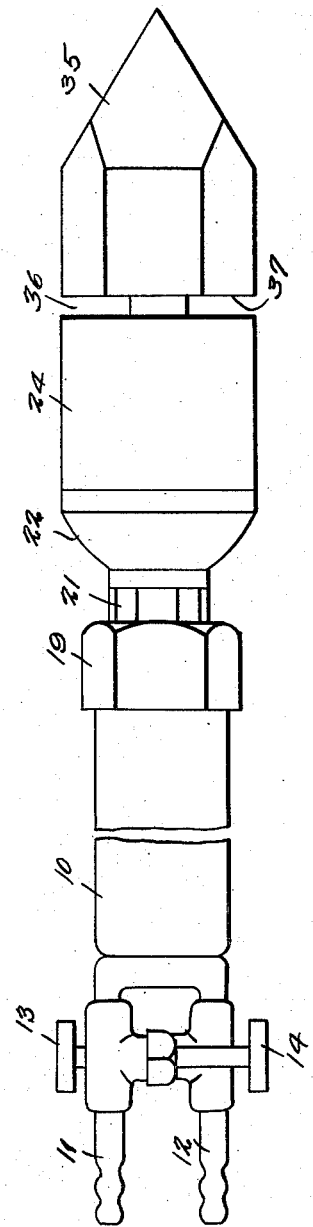
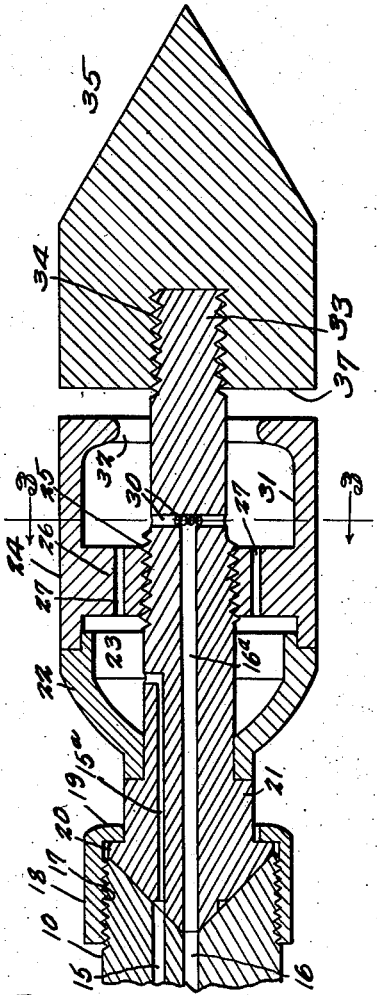
Frank A. Schmidt
INVENTOR
BY *C A Snow & Co.*
ATTORNEYS.

Patented Oct. 10, 1950

2,524,997

UNITED STATES PATENT OFFICE 2,524,997

SOLDERING IRON

Frank Alven Schmidt, Iola, Wis.

Application March 20, 1947, Serial No. 736,079

1 Claim. (Cl. 158—26)

This invention relates to a soldering iron, and more particularly to a soldering iron of the liquid or gas fuel burning types.

A primary object of the invention resides in the provision of an improved soldering iron, the temperature of which may be readily and expeditiously controlled to maintain the iron at a uniform working temperature with a minimum amount of fuel consumption.

A further object of the invention is the provision of a soldering iron including a combustion chamber positioned adjacent the base of the soldering head and so arranged and constructed that the heat generated therein will be directed to the base of the soldering head for uniform radiation to the working end thereof, thus permitting a uniform heating throughout the length of the head.

A further and more specific object of the invention comprises a soldering iron of this character providing an improved construction over my Patent Number 2,393,480, issued January 22, 1946, to the end that more efficient and uniform radiation throughout the length of the head may be provided.

Still other objects reside in the combination of elements, arrangements of parts, and features of construction, all of which will be more fully pointed out hereinafter and disclosed in the accompanying drawing wherein there is shown a preferred embodiment of this inventive concept.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1 is a side elevational view of one form of soldering iron embodying features of this inventive concept, certain portions thereof being broken away.

Figure 2 is an enlarged longitudinal sectional view taken substantially along the center line of the head and the combustion chamber of the iron in Figure 1.

Figure 3 is a sectional view taken substantially along the line 3—3 of Figure 2 in the direction indicated by the arrows.

Similar reference characters refer to similar parts throughout the several views of the drawing.

Referring now to the drawing in detail, the device of the present invention includes a pipe 10, having a fitting at one end terminating in fuel and air admission pipes 11 and 12 respectively, each being provided with a control valve, 13 and 14 respectively. As best shown in Figure 2, the inlet 11 communicates with a passageway 15, while the inlet 12 communicates with a bore 16, extending through the pipe section 10, which is threaded as at 17, to accommodate an internally threaded lock nut 18, provided with a flange 19.

The flange 19 is adapted to bear against a corresponding flange 20, comprising a portion of a fitting section 21, seated in a suitable recess in the end of the pipe-like member 10 and having bores 15a and 16a communicating with the bores 15 and 16 respectively.

The fitting 21 is surrounded by a cup-shaped member 22, forming an internal chamber 23 thereabout, into which the passageway 15a opens.

A second section 24, threadedly engages suitable threads 25 positioned at an intermediate point on the fitting 21, and includes a partition member 26 pierced by a plurality of radially positioned laterally extending passageways 27 surrounding and substantially parallel to the bore 16a.

The bore 16a extends beyond the partition 26, and terminates in a plurality of radially perpendicular passages 30, which extend outwardly through the fitting and exit into a combustion chamber 31, where the fuel emitted therefrom is adapted to be mixed for combustion with the air passed through passageways 27.

A relatively large aperture 32 is formed at the end of the member 24, to permit the escape of heat and gases of combustion. The extremity 33 of the fitting 21 terminates in a threaded portion 34, adapted to engage in a suitable threaded recess in the head 35 of the soldering iron, the arrangement being such that a space 36 is left between the aperture 32 and the base of the soldering iron 35.

From the foregoing, it will now be seen that air admitted through the bore 15a exits through the passageway 27 into the combustion chamber 31, where it is mixed with fuel emanating from the radial passages 30 which, as previously pointed out, communicate with the bore 16a. Combusion takes place in the chamber 31, and the gases of combustion exiting through the aperture 32 and impinges against the base 37 of the head 35, with the space 36, thus imparting a uniform heat to the soldering head throughout its entire length.

From the foregoing, it will now be seen that there is herein provided an improved soldering iron, which accomplishes all the objects of this invention, and others, including many advantages of great practical utility and commercial importance.

As various embodiments may be made of this inventive concept, and as various modifications may be made in the embodiment hereinbefore shown and described, it is to be understood that all matter herein is to be interpreted merely as illustrative, and not in a limiting sense.

What is claimed is:

In a soldering iron, a fitting having a central longitudinally disposed fuel bore terminating in transversely disposed fuel passageways, said fitting having a second longitudinally disposed bore spaced from the central bore having a laterally extended end, a cup-shaped member mounted on the fitting into which the laterally extended end of the second bore discharges air, means forming a combustion chamber mounted on the fitting into which the transversely disposed fuel passageway discharges fuel, said combustion chamber means having bores extending in parallel relation with the axis of said fuel bore providing air passageways between the cup-shaped member and combustion chamber, whereby fuel is directed into the path of travel of air entering the combustion chamber at right angles to the path of travel of the air entering the combustion chamber, said combustion chamber having an open end through which products of combustion pass therefrom, and a soldering head mounted in spaced relation with the open end of the combustion chamber, the soldering head being heated by the products of combustion passing from the combustion chamber.

FRANK ALVEN SCHMIDT.

REFERENCES CITED

The following references are of record in the file of this patent:

UNITED STATES PATENTS

| Number | Name | Date |
|---|---|---|
| 2,393,480 | Schmidt | Jan. 22, 1946 |